(12) United States Patent
Takahashi

(10) Patent No.: US 12,508,848 B2
(45) Date of Patent: Dec. 30, 2025

(54) PNEUMATIC TIRE

(71) Applicant: The Yokohama Rubber Co., LTD., Tokyo (JP)

(72) Inventor: Natsumi Takahashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 687 days.

(21) Appl. No.: 17/594,746

(22) PCT Filed: Apr. 7, 2020

(86) PCT No.: PCT/JP2020/015701
§ 371 (c)(1),
(2) Date: Jun. 20, 2022

(87) PCT Pub. No.: WO2020/226017
PCT Pub. Date: Nov. 12, 2020

(65) Prior Publication Data
US 2022/0332148 A1   Oct. 20, 2022

(30) Foreign Application Priority Data

May 8, 2019   (JP) .................................. 2019-088071

(51) Int. Cl.
*B60C 11/12*      (2006.01)
*B60C 11/03*      (2006.01)

(52) U.S. Cl.
CPC ...... *B60C 11/1281* (2013.01); *B60C 11/0302* (2013.01); *B60C 11/1259* (2013.01)

(58) Field of Classification Search
CPC ............. B60C 11/1236; B60C 11/1281; B60C 11/1392
See application file for complete search history.

(56) References Cited

U.S. PATENT DOCUMENTS 6,467,517 B1   10/2002   Radulescu
2014/0305563 A1*   10/2014   Kujime .................. B60C 11/04
                                                         152/209.18
(Continued)

FOREIGN PATENT DOCUMENTS

EP   3401125 A1   11/2018
JP   2001-219715 A   8/2001
(Continued)

OTHER PUBLICATIONS

English machine translation of JP2003011619 (Year: 2003).*

*Primary Examiner* — Robert C Dye
(74) *Attorney, Agent, or Firm* — Thorpe North & Western

(57) ABSTRACT

A pneumatic tire includes chamfered sipes in a land portion each including a chamfered portion, and non-chamfered sipes in the land portion each not including the chamfered portion. The chamfered sipe includes one end communicating with the main groove that defines the land portion and the other end terminating within the land portion. The chamfered and non-chamfered sipes are alternately disposed in the circumferential direction. Of the non-chamfered sipes on both sides in the circumferential direction of the chamfered sipe, a relationship between a distance a and a distance b is in the range $1.5 \leq (b/a) \leq 12$, where the distance a is between the chamfered sipe and a near sipe corresponding to the non-chamfered sipe located on a side closest to the chamfered sipe, and the distance b is between the chamfered sipe and the non-chamfered sipe located further from the chamfered sipe in the circumferential direction.

18 Claims, 14 Drawing Sheets

(56) References Cited

U.S. PATENT DOCUMENTS

2017/0050472 A1* 2/2017 Matsuyama ........ B60C 11/0304
2019/0344622 A1* 11/2019 Shimizu .................. B60C 11/04
2021/0122194 A1* 4/2021 Uemura ............. B60C 11/1392

FOREIGN PATENT DOCUMENTS

| JP | 2003011619 A | * | 1/2003 | ........... B60C 11/125 |
|---|---|---|---|---|
| JP | 2003-159911 A | | 6/2003 | |
| JP | 2018-111452 A | | 7/2018 | |
| JP | 2018-111453 A | | 7/2018 | |
| JP | 6364781 B2 | | 8/2018 | |
| JP | 2020-55493 A | | 4/2020 | |
| WO | WO-2017141914 A1 | * | 8/2017 | ............. B60C 11/04 |
| WO | 2018/207112 A1 | | 11/2018 | |
| WO | 2019/049765 A1 | | 3/2019 | |

* cited by examiner

|  | Conventional Example | Comparative Example 1 | Comparative Example 2 | Example 1 | Example 2 | Example 3 | Example 4 | Example 5 |
|---|---|---|---|---|---|---|---|---|
| Presence of chamfered sipe | Yes | Yes | Yes | Yes | Yes | Yes | Yes | Yes |
| Presence of near sipe | No | Yes | Yes | Yes | Yes | Yes | Yes | Yes |
| Distance ratio b/a between sipes | - | 1.4 | 12.2 | 1.5 | 2 | 3 | 5 | 4 |
| Sipe length ratio Lm/Lp | - | 0.15 | 0.15 | 0.15 | 0.15 | 0.15 | 0.15 | 0.2 |
| Direction of chamfered portion | Remote sipe side | Remote sipe side | Remote sipe side | Remote sipe side | Remote sipe side | Remote sipe side | Remote sipe side | Remote sipe side |
| Sipe opening width ratio Wm/Wp | - | 1.1 | 1.1 | 1.1 | 1.1 | 1.1 | 1.1 | 1.1 |
| Ratio Wm1/Wm of groove bottom width to opening width of chamfered sipe | 0.08 | 0.08 | 0.08 | 0.08 | 0.08 | 0.08 | 0.08 | 0.08 |
| Presence of communication of near sipe with both main grooves | - | No | No | No | No | No | No | No |
| Sipe depth ratio Dm/Dp | - | 1.15 | 1.15 | 1.15 | 1.15 | 1.15 | 1.15 | 1.15 |
| Ratio Dm1/Dm of chamfered portion depth to groove depth of chamfered sipe | 0.08 | 0.08 | 0.08 | 0.08 | 0.08 | 0.08 | 0.08 | 0.08 |
| Main groove with which chamfered sipe communicates | Main grooves on both sides | Main grooves on both sides | Main grooves on both sides | Main grooves on both sides | Main grooves on both sides | Main grooves on both sides | Main grooves on both sides | Main grooves on both sides |
| Sipe located on leading side | Chamfered sipe | Chamfered sipe | Chamfered sipe | Chamfered sipe | Chamfered sipe | Chamfered sipe | Chamfered sipe | Chamfered sipe |
| Presence of land portion bulging | No | No | No | No | No | No | No | No |
| Wet braking performance | 100 | 99 | 100 | 101 | 101 | 102 | 102 | 103 |
| Steering stability | 100 | 100 | 98 | 100 | 100 | 100 | 100 | 100 |

FIG. 11A

|  | Example 6 | Example 7 | Example 8 | Example 9 | Example 10 | Example 11 | Example 12 | Example 13 |
|---|---|---|---|---|---|---|---|---|
| Presence of chamfered sipe | Yes | Yes | Yes | Yes | Yes | Yes | Yes | Yes |
| Presence of near sipe | Yes | Yes | Yes | Yes | Yes | Yes | Yes | Yes |
| Distance ratio b/a between sipes | 4 | 4 | 4 | 4 | 4 | 4 | 4 | 4 |
| Sipe length ratio Lm/Lp | 0.95 | 0.97 | 0.4 | 0.4 | 0.4 | 0.4 | 0.4 | 0.4 |
| Direction of chamfered portion | Remote sipe side | Remote sipe side | Remote sipe side | Near sipe side | Near sipe side | Near sipe side | Near sipe side | Near sipe side |
| Sipe opening width ratio Wm/Wp | 1.1 | 1.1 | 1.1 | 1.1 | 1.2 | 6.0 | 6.5 | 3 |
| Ratio Wm1/Wm of groove bottom width to opening width of chamfered sipe | 0.08 | 0.08 | 0.08 | 0.08 | 0.08 | 0.08 | 0.08 | 0.08 |
| Presence of communication of near sipe with both main grooves | No | No | No | No | No | No | No | No |
| Sipe depth ratio Dm/Dp | 1.15 | 1.15 | 1.15 | 1.15 | 1.15 | 1.15 | 1.15 | 1.15 |
| Ratio Dm1/Dm of chamfered portion depth to groove depth of chamfered sipe | 0.08 | 0.08 | 0.08 | 0.08 | 0.08 | 0.08 | 0.08 | 0.08 |
| Main groove with which chamfered sipe communicates | Main grooves on both sides | Main grooves on both sides | Main grooves on both sides | Main grooves on both sides | Main grooves on both sides | Main grooves on both sides | Main grooves on both sides | Main grooves on both sides |
| Sipe located on leading side | Chamfered sipe | Chamfered sipe | Chamfered sipe | Chamfered sipe | Chamfered sipe | Chamfered sipe | Chamfered sipe | Chamfered sipe |
| Presence of land portion bulging | No | No | No | No | No | No | No | No |
| Wet braking performance | 103 | 103 | 104 | 105 | 106 | 106 | 106 | 107 |
| Steering stability | 100 | 99 | 100 | 100 | 100 | 100 | 98 | 100 |

FIG. 11B

| | Example 14 | Example 15 | Example 16 | Example 17 | Example 18 | Example 19 | Example 20 | Example 21 |
|---|---|---|---|---|---|---|---|---|
| Presence of chamfered sipe | Yes | Yes | Yes | Yes | Yes | Yes | Yes | Yes |
| Presence of near sipe | Yes | Yes | Yes | Yes | Yes | Yes | Yes | Yes |
| Distance ratio b/a between sipes | 4 | 4 | 4 | 4 | 4 | 4 | 4 | 4 |
| Sipe length ratio Lm/Lp | 0.4 | 0.4 | 0.4 | 0.4 | 0.4 | 0.4 | 0.4 | 0.4 |
| Direction of chamfered portion | Near sipe side | Near sipe side | Near sipe side | Near sipe side | Near sipe side | Near sipe side | Near sipe side | Near sipe side |
| Sipe opening width ratio Wm/Wp | 3 | 3 | 3 | 3 | 3 | 3 | 3 | 3 |
| Ratio Wm1/Wm of groove bottom width to opening width of chamfered sipe | 0.1 | 0.85 | 0.9 | 0.4 | 0.4 | 0.4 | 0.4 | 0.4 |
| Presence of communication of near sipe with both main grooves | No | No | No | No | Yes | Yes | Yes | Yes |
| Sipe depth ratio Dm/Dp | 1.15 | 1.15 | 1.15 | 1.15 | 1.15 | 1.2 | 8 | 8.2 |
| Ratio Dm1/Dm of chamfered portion depth to groove depth of chamfered sipe | 0.08 | 0.08 | 0.08 | 0.08 | 0.08 | 0.08 | 0.08 | 0.08 |
| Main groove with which chamfered sipe communicates | Main grooves on both sides | Main grooves on both sides | Main grooves on both sides | Main grooves on both sides | Main grooves on both sides | Main grooves on both sides | Main grooves on both sides | Main grooves on both sides |
| Sipe located on leading side | Chamfered sipe | Chamfered sipe | Chamfered sipe | Chamfered sipe | Chamfered sipe | Chamfered sipe | Chamfered sipe | Chamfered sipe |
| Presence of land portion bulging | No | No | No | No | No | No | No | No |
| Wet braking performance | 108 | 108 | 108 | 109 | 109 | 110 | 110 | 110 |
| Steering stability | 100 | 100 | 98 | 100 | 100 | 100 | 100 | 98 |

| | Example 22 | Example 23 | Example 24 | Example 25 | Example 26 | Example 27 | Example 28 | Example 29 |
|---|---|---|---|---|---|---|---|---|
| Presence of chamfered sipe | Yes | Yes | Yes | Yes | Yes | Yes | Yes | Yes |
| Presence of near sipe | Yes | Yes | Yes | Yes | Yes | Yes | Yes | Yes |
| Distance ratio b/a between sipes | 4 | 4 | 4 | 4 | 4 | 4 | 4 | 4 |
| Sipe length ratio Lm/Lp | 0.4 | 0.4 | 0.4 | 0.4 | 0.4 | 0.4 | 0.4 | 0.4 |
| Direction of chamfered portion | Near sipe side | Near sipe side | Near sipe side | Near sipe side | Near sipe side | Near sipe side | Near sipe side | Near sipe side |
| Sipe opening width ratio Wm/Wp | 3 | 3 | 3 | 3 | 3 | 3 | 3 | 3 |
| Ratio Wm1/Wm of groove bottom width to opening width of chamfered sipe | 0.4 | 0.4 | 0.4 | 0.4 | 0.4 | 0.4 | 0.4 | 0.4 |
| Presence of communication of near sipe with both main grooves | Yes | Yes | Yes | Yes | Yes | Yes | Yes | Yes |
| Sipe depth ratio Dm/Dp | 2 | 2 | 2 | 2 | 2 | 2 | 2 | 2 |
| Ratio Dm1/Dm of chamfered portion depth to groove depth of chamfered sipe | 0.08 | 0.1 | 0.85 | 0.9 | 0.4 | 0.4 | 0.4 | 0.4 |
| Main groove with which chamfered sipe communicates | Main grooves on both sides | Main grooves on both sides | Main grooves on both sides | Main grooves on both sides | Main grooves on both sides | Main groove on one side | Main groove on one side | Main groove on one side |
| Sipe located on leading side | Chamfered sipe | Chamfered sipe | Chamfered sipe | Chamfered sipe | Chamfered sipe | Chamfered sipe | Near sipe | Near sipe |
| Presence of land portion bulging | No | No | No | No | No | No | No | Yes |
| Wet braking performance | 111 | 112 | 112 | 111 | 113 | 113 | 114 | 115 |
| Steering stability | 100 | 100 | 100 | 98 | 100 | 102 | 102 | 103 |

PNEUMATIC TIRE

TECHNICAL FIELD

The present technology relates to a pneumatic tire.

BACKGROUND ART

In a pneumatic tire, a plurality of grooves are formed in a surface of a tread portion for the purpose of discharging water between a tread contact surface and a road surface when traveling on wet road surfaces. In addition, some known pneumatic tires provide improved drainage properties by devising the form of so-called sipes which are cutting formed in the tread portion. For example, pneumatic tires described in Japan Unexamined Patent Publication No. 2018-111453 and Japan Patent No. 6364781 provide improved wet performance, which is running performance on wet road surfaces, by devising the arrangement of chamfered sipes, which are sipes including chamfered portions. In other words, in Japan Unexamined Patent Publication No. 2018-111453 and Japan Patent No. 6364781, wet performance is improved by alternately disposing, in a tire circumferential direction, chamfered sipes that communicate with one main groove of two main grooves that define both sides in a tire width direction of a rib in which the chamfered sipes are formed, and the chamfered sipes that communicate with the other main groove.

However, when the chamfered sipes that communicate with the different main grooves are alternately disposed in the tire circumferential direction, rigidity of the rib in a portion between the chamfered sipes during an initial use of the pneumatic tire may deteriorate, and thus steering stability on dry road surfaces during the initial use of the pneumatic tire may easily decline.

However, when the chamfered sipes that communicate with the different main grooves are alternately disposed in the tire circumferential direction, rigidity of the rib in a portion between the chamfered sipes during an initial use of the pneumatic tire may deteriorate, and thus steering stability on dry road surfaces during the initial use of the pneumatic tire may easily decline.

SUMMARY

The present technology provides a pneumatic tire that can ensure wet performance while suppressing a decrease in steering stability.

A pneumatic tire according to an embodiment of the present technology includes a plurality of main grooves extending in a tire circumferential direction, a land portion including end portions in a tire width direction that are defined by the main grooves, a plurality of chamfered sipes formed in the land portion, each of the chamfered sipes including a chamfered portion, and a plurality of non-chamfered sipes formed in the land portion, each of the non-chamfered sipes not including the chamfered portion. The chamfered sipe includes one end communicating with the main groove that defines the land portion and the other end terminating within the land portion. The chamfered sipes and the non-chamfered sipes are alternately disposed in the tire circumferential direction. Of the non-chamfered sipes located on both sides in the tire circumferential direction of the chamfered sipe, a relationship between a distance a and a distance b in the tire circumferential direction is in the range $1.5 \leq (b/a) \leq 12$, where the distance a in the tire circumferential direction is a distance between the chamfered sipe and a near sipe corresponds to the non-chamfered sipe that is located on a side close to the chamfered sipe in the tire circumferential direction, and the distance b in the tire circumferential direction is a distance between the chamfered sipe and the non-chamfered sipe that is located on a side remote from the chamfered sipe in the tire circumferential direction.

Further, in the pneumatic tire described above, a relationship between a length Lm of the chamfered sipe and a length Lp of the near sipe is preferably in the range $0.2 \leq (Lm/Lp) \leq 0.95$.

Furthermore, in the pneumatic tire described above, of opposed wall surfaces of the chamfered sipe, the wall surface located on a side close to the near sipe is preferably provided with the chamfered portion.

Additionally, in the pneumatic tire described above, a relationship between an opening width Wm of the chamfered sipe and an opening width Wp of the near sipe is preferably in the range $1.2 \leq (Wm/Wp) \leq 6.0$.

Moreover, in the pneumatic tire described above, the chamfered sipe preferably has a relationship between an opening width Wm and a groove bottom width Wm1 being in the range $0.1 \leq (Wm1/Wm) \leq 0.85$.

Further, in the pneumatic tire described above, both sides of the land portion in the tire width direction are preferably defined by the main grooves, and the near sipe preferably communicates with two of the main grooves that define the land portion.

Furthermore, in the pneumatic tire described above, a relationship between a groove depth Dm of the chamfered sipe and a groove depth Dp of the near sipe is preferably in the range $1.2 \leq (Dp/Dm) \leq 8.0$.

Additionally, in the pneumatic tire described above, the chamfered sipe preferably has a relationship between a groove depth Dm and a chamfered portion depth Dm1 being in the range $0.1 \leq (Dm1/Dm) \leq 0.85$.

Moreover, in the pneumatic tire described above, both sides of the land portion in the tire width direction are preferably defined by the main grooves, and the plurality of chamfered sipes formed in the identical land portion preferably communicate with the identical main groove.

Further, in the pneumatic tire described above, of the chamfered sipe and the near sipe, the near sipe is preferably disposed on a leading side in a tire rotation direction.

Furthermore, in the pneumatic tire described above, the land portion in which the chamfered sipes are formed preferably includes a road contact surface that bulges from a standard contour line of a tread profile toward an outer side in a tire radial direction in a tire meridian cross-sectional view.

A pneumatic tire according to the present technology achieves the effect that can ensure wet performance while suppressing a decrease in steering stability.

BRIEF DESCRIPTION OF DRAWINGS

FIG. 11A is a table indicating the results of performance evaluation tests of pneumatic tires.

FIG. 11B is a table indicating the results of performance evaluation tests of pneumatic tires.

FIG. 11C is a table indicating the results of performance evaluation tests of pneumatic tires.

FIG. 11D is a table indicating the results of performance evaluation tests of pneumatic tires.

DETAILED DESCRIPTION

Pneumatic tires according to embodiments of the present technology are described in detail below with reference to the drawings. However, the present technology is not limited by the embodiment. Constituents of the following embodiments include elements that are essentially identical or that can be substituted or easily conceived of by a person skilled in the art.

Embodiments

In the following description, the term "tire radial direction" refers to a direction orthogonal to the tire rotation axis (not illustrated) which is a rotation axis of a pneumatic tire 1, the term "inner side in the tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equatorial line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. The term "tire equator line" refers to a line in the tire circumferential direction of the pneumatic tire 1 that lies on the tire equatorial plane CL.

Figure 1:
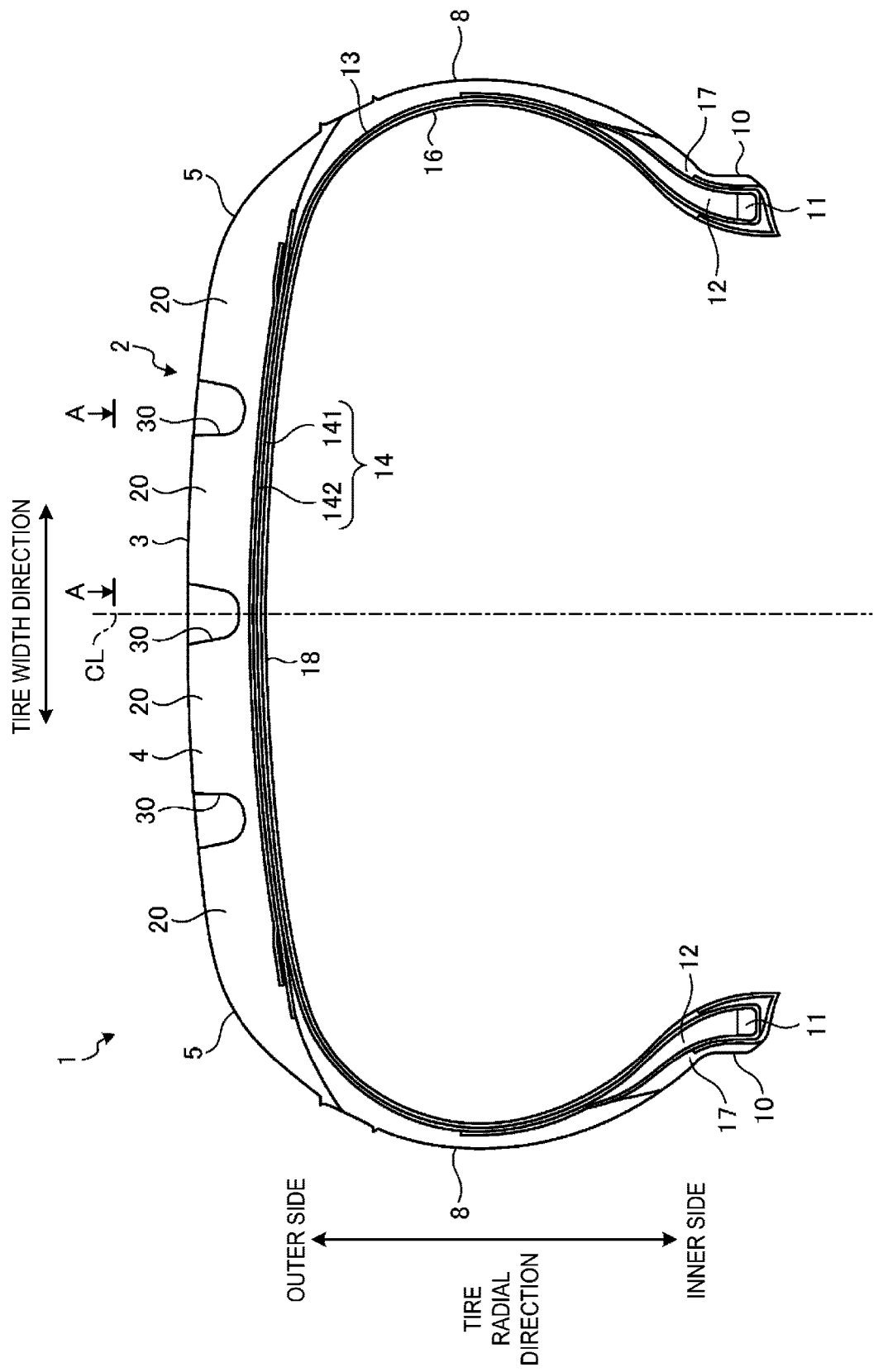
FIG. 1 is a meridian cross-sectional view illustrating a main portion of a pneumatic tire according to an embodiment.

FIG. 1 is a meridian cross-sectional view illustrating a main portion of the pneumatic tire 1 according to the embodiment. In the pneumatic tire 1 according to the present embodiment, a tread portion 2 is disposed on a portion on the outermost side in the tire radial direction when viewed in a meridian cross-section, and the tread portion 2 includes a tread rubber layer 4 made of a rubber composition. A surface of the tread portion 2, that is, a portion that comes in contact with road surfaces during traveling of a vehicle (not illustrated) on which the pneumatic tires 1 are mounted is formed as a road contact surface 3, and the road contact surface 3 forms a portion of a contour of the pneumatic tire 1.

In the tread portion 2, a plurality of main grooves 30 extending in the tire circumferential direction are formed in the road contact surface 3. The plurality of main grooves 30 are disposed side by side in the tire width direction. Additionally, a plurality of land portions 20 including end portions in the tire width direction, which are defined by the main grooves 30, are formed in the tread portion 2. In the present embodiment, three of the main grooves 30 are disposed side by side in the tire width direction, and in accordance therewith, four rows of the land portions 20 are arranged in the tire width direction with the main grooves 30 in between. The four rows of the land portions 20 each are formed in a rib shape extending in the tire circumferential direction.

Note that "main groove 30" refers to a vertical groove in which at least a part is extending in the tire circumferential direction. In general, the main groove 30 has a groove width of 3.0 mm or more and a groove depth of 5.5 mm or more and includes therein a tread wear indicator (slip sign) that indicates terminal stages of wear. The main groove 30 may linearly extend in the tire circumferential direction, or may repeatedly oscillate in the tire width direction while extending in the tire circumferential direction and thus be formed in a wave-like shape or a zigzag shape.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, a pair of the bead portions 10 is disposed on both sides in the tire width direction of the tire equatorial plane CL. Each bead portion 10 is provided with a bead core 11, and a bead filler 12 is provided on an outer side in the tire radial direction of the bead core 11. The bead core 11 is an annular member formed in an annular shape by bundling bead wires, which are steel wires, and the bead filler 12 is a rubber member disposed on the outer side in the tire radial direction of the bead core 11.

Additionally, a belt layer 14 is disposed in the tread portion 2. The belt layer 14 is formed by a multilayer structure in which a plurality of belts 141, 142 are layered, and the two layers of the belts 141, 142 are layered in the present embodiment. The belts 141, 142 constituting the belt layer 14 are formed by covering, with coating rubber, a plurality of belt cords made of steel or an organic fiber material such as polyester, rayon, or nylon, and performing a rolling process on the belt cords. A belt angle defined as an inclination angle in the tire width direction of the belt cords with respect to the tire circumferential direction is in a predetermined range (for example, of 20° or more and 55° or less). Furthermore, the belt angles of the two layers of the belts 141, 142 differ from each another. Accordingly, the belt layer 14 is configured as a so-called crossply structure in which the two layers of the belts 141, 142 are layered with the inclination directions of the belt cords intersecting with each another. In other words, the two layers of the belts 141, 142 are provided as so-called cross belts in which the belt cords provided with the respective belts 141, 142 are disposed in mutually intersecting orientations. The tread rubber layer 4 of the tread portion 2 is disposed on the outer side of the belt layer 14 in the tire radial direction in the tread portion 2.

A carcass layer 13 containing the cords of radial plies is continuously provided on an inner side in the tire radial direction of the belt layer 14 and on a side of the sidewall portion 8 close to the tire equatorial plane CL. Accordingly, the pneumatic tire 1 according to the present embodiment is configured as a so-called radial tire. The carcass layer 13 has a single layer structure made of one carcass ply or a multilayer structure made of a plurality of carcass plies being layered, and spans between the pair of bead portions 10 disposed on both sides in the tire width direction in a toroidal shape to form the framework of the tire.

Specifically, the carcass layer 13 is disposed to span from one bead portion 10 to the other bead portion 10 among the pair of bead portions 10 located on both sides in the tire width direction and turns back toward the outer side in the tire width direction along the bead cores 11 at the bead portions 10 wrapping around the bead cores 11 and the bead fillers 12. The bead filler 12 is a rubber member disposed in a space formed on the outer side in the tire radial direction of the bead core 11 when the carcass layer 13 is folded back at the bead portion 10. Moreover, the belt layer 14 is disposed on the outer side in the tire radial direction of a portion, located in the tread portion 2, of the carcass layer 13 spanning between the pair of bead portions 10. Moreover, the carcass ply of the carcass layer 13 is made by rolling subsequent to covering, with coating rubber, a plurality of carcass cords made from steel or an organic fiber material such as aramid, nylon, polyester, or rayon. The plurality of carcass cords that form the carcass ply are disposed side by side with an angle in the tire circumferential direction, the angle with respect to the tire circumferential direction following a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner portion side of the carcass layer 13 in the pneumatic tire 1. The innerliner 16 forms a tire inner surface 18 that is a surface on the inner side of the pneumatic tire 1.

Figure 2:
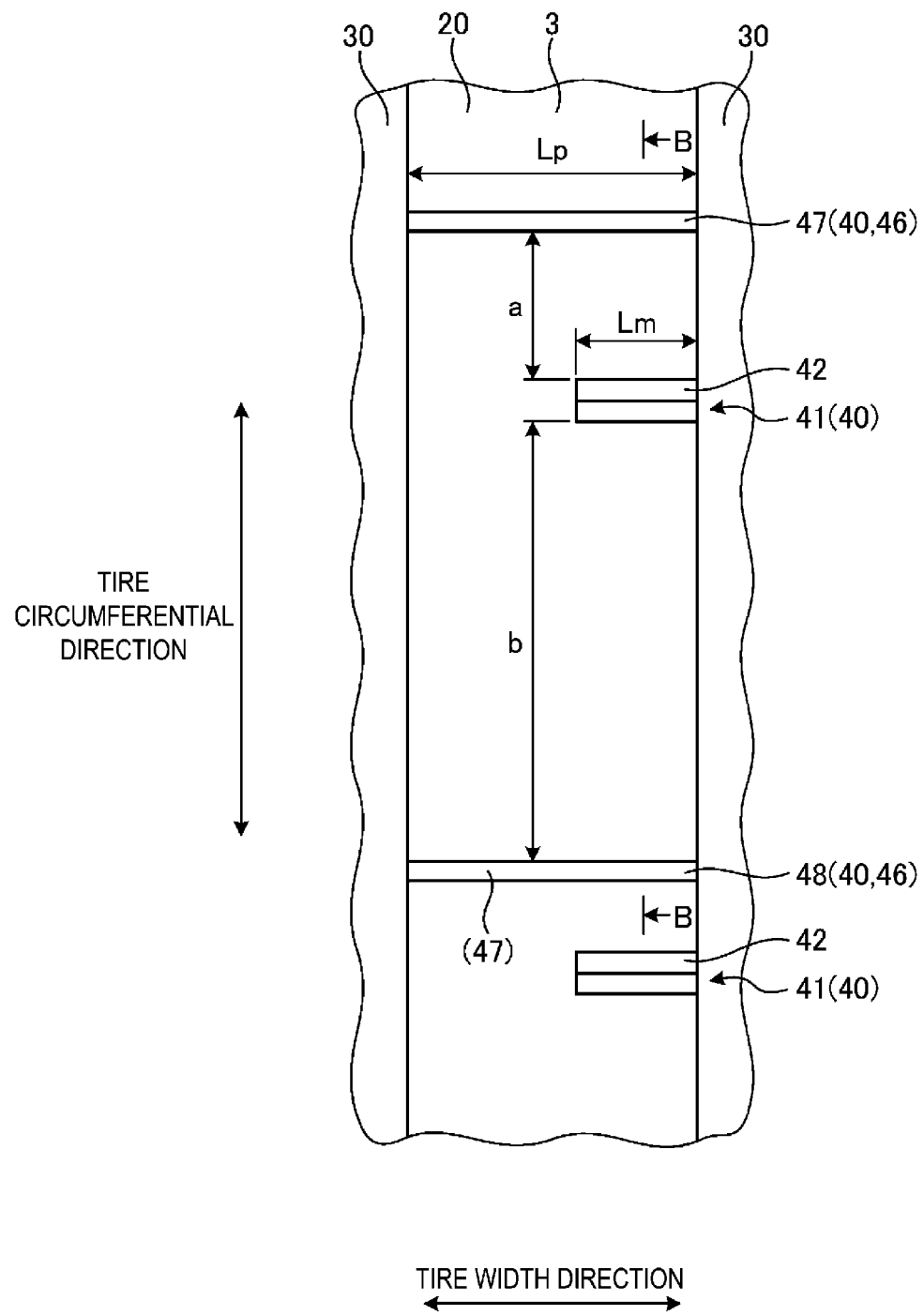
FIG. 2 is a view taken along line A-A of FIG. 1 in the direction of the arrows.
Figure 3:
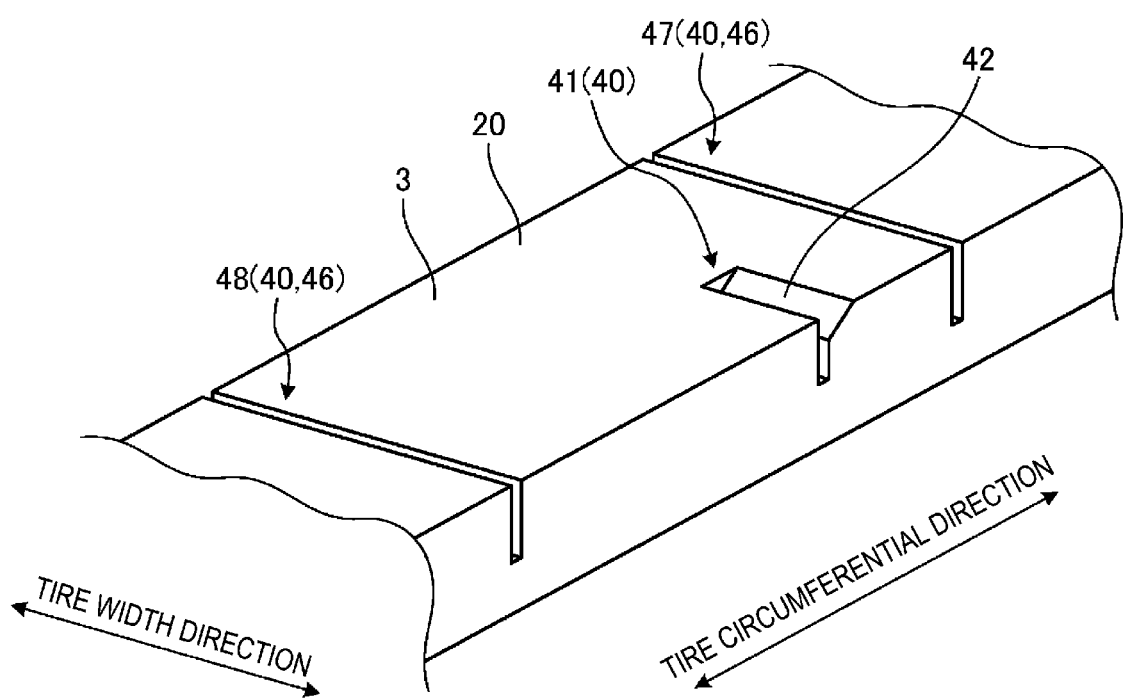
FIG. 3 is a perspective view of a land portion illustrated in FIG. 2.

FIG. 2 is a view taken along line A-A of FIG. 1 in the direction of the arrows. FIG. 3 is a perspective view of the land portion 20 illustrated in FIG. 2. Note that FIGS. 2 and 3 illustrate, of the plurality of land portions 20, the land portion 20 of which both sides in the tire width direction are defined by the main grooves 30. As illustrated in FIGS. 2 and 3, a plurality of sipes 40 are formed in the land portion 20. The sipes 40 described here each are formed in a narrow groove shape in the road contact surface 3, and in a state before the pneumatic tire 1 is mounted on a rim, a width between wall surfaces constituting the narrow groove is less than 2 mm and a depth of the narrow groove from the road contact surface 3 is 2 mm or more.

The plurality of sipes 40 include a plurality of chamfered sipes 41 that are the sipes 40 each including a chamfered portion 42 and a plurality of non-chamfered sipes 46 that are the sipes 40 each not including the chamfered portion 42. The chamfered portion 42 in this case refers to a cutout portion obtained by cutting out a portion of an edge on which the wall surface of the sipe 40 and the road contact surface 3 intersect, and the chamfered portion 42 can have a shape such as a rectangular shape or an inclination.

The plurality of chamfered sipes 41 and the plurality of non-chamfered sipes 46 are provided in the single land portion 20, and the plurality of chamfered sipes 41 and the plurality of non-chamfered sipe 46 are alternately disposed in the tire circumferential direction. In this case, the pitch of the chamfered sipes 41 in the tire circumferential direction and the pitch of the non-chamfered sipes 46 in the tire circumferential direction are equal to each other, and the chamfered sipes 41 and the non-chamfered sipes 46 are disposed such that the phases thereof are offset in the tire circumferential direction.

Of the sipes, one end of the chamfered sipe 41 communicates with the main groove 30 that defines the land portion 20, and the other end of the chamfered sipe 41 terminates within the land portion 20. Additionally, the chamfered sipes 41 are configured such that the plurality of chamfered sipes 41 formed in the identical land portion 20 communicate with the identical main groove 30 of the two main grooves 30 that define the both sides in the tire width direction of the land portion 20. In other words, all of the plurality of chamfered sipes 41 formed in the single land portion 20 communicate with the identical main groove 30.

Meanwhile, both ends in a length direction of the non-chamfered sipe 46 communicate with both of the two main grooves 30 that define the land portion 20. In other words, the non-chamfered sipe 46 extends in the tire width direction through the land portion 20 in which the non-chamfered sipe 46 is formed.

Accordingly, a length Lm of the chamfered sipe 41 and a length Lp of the non-chamfered sipe 46 have the relationship Lm<Lp, and specifically, that is in the range $0.2 \leq (Lm/Lp) \leq 0.95$. Note that the lengths Lm, Lp in this case are lengths in the extension direction of the chamfered sipe 41 and the non-chamfered sipe 46, that is, are lengths in the direction along the shapes of the chamfered sipe 41 and the non-chamfered sipe 46. The relationship between the length Lm of the chamfered sipe 41 and the length Lp of the non-chamfered sipe 46 is preferably in the range $0.3 \leq (Lm/Lp) \leq 0.8$, and specifically, the length Lm of the chamfered sipe 41 is preferably in the range of 2 mm or more and 30 mm or less.

Since the chamfered sipes 41 and the non-chamfered sipes 46 are alternately disposed in the tire circumferential direction, the non-chamfered sipes 46 are located on both sides in the tire circumferential direction of the chamfered sipe 41. Since the chamfered sipes 41 and the non-chamfered sipes 46 are disposed such that the phases thereof are offset in the tire circumferential direction, the two non-chamfered sipes 46 located on the both sides in the tire circumferential direction of the chamfered sipe 41 have different distances to the chamfered sipe 41 in the tire circumferential direction.

Of the non-chamfered sipes 46 located at the different distances to the chamfered sipe 41 on the both sides in the tire circumferential direction of the chamfered sipe 41, the non-chamfered sipe 46 on the side of the closer distance in the tire circumferential direction to the chamfered sipe 41 is a near sipe 47, and the non-chamfered sipe 46 on the side of the remoter distance in the tire circumferential direction from the chamfered sipe 41 is a remote sipe 48. Both the near sipe 47 and the remote sipe 48 communicate with the two main grooves 30 that define the land portion 20 in which the near sipe 47 and the remote sipe 48 are formed. In addition, since the near sipe 47 is the non-chamfered sipe 46, in comparison of the lengths of the chamfered sipe 41 and the near sipe 47, the relationship between the length Lm of the chamfered sipe 41 and the length Lp of the near sipe 47 is in the range $0.2 \leq (Lm/Lp) \leq 0.95$.

Note that the near sipe 47 and the remote sipe 48 are defined based on the distances from the chamfered sipe 41 located between the two non-chamfered sipes 46 that are adjacent to each other with the chamfered sipe 41 in between. Consequently, the near sipe 47 to the certain chamfered sipe 41 is treated as the remote sipe 48 with respect to the chamfered sipe 41 adjacent to the certain chamfered sipe 41 with the near sipe 47 in between. Similarly, the remote sipe 48 to the certain chamfered sipe 41 is treated as the near sipe 47 with respect to the chamfered sipe 41 adjacent to the certain chamfered sipe 41 with the remote sipe 48 in between.

The chamfered sipe 41, the near sipe 47, and the remote sipe 48 that are defined as described above have the relationship between a distance a in the tire circumferential direction between the chamfered sipe 41 and the near sipe 47 and a distance b in the tire circumferential direction between the chamfered sipe 41 and the remote sipe 48 being in the range $1.5 \leq (b/a) \leq 12$.

Figure 4:
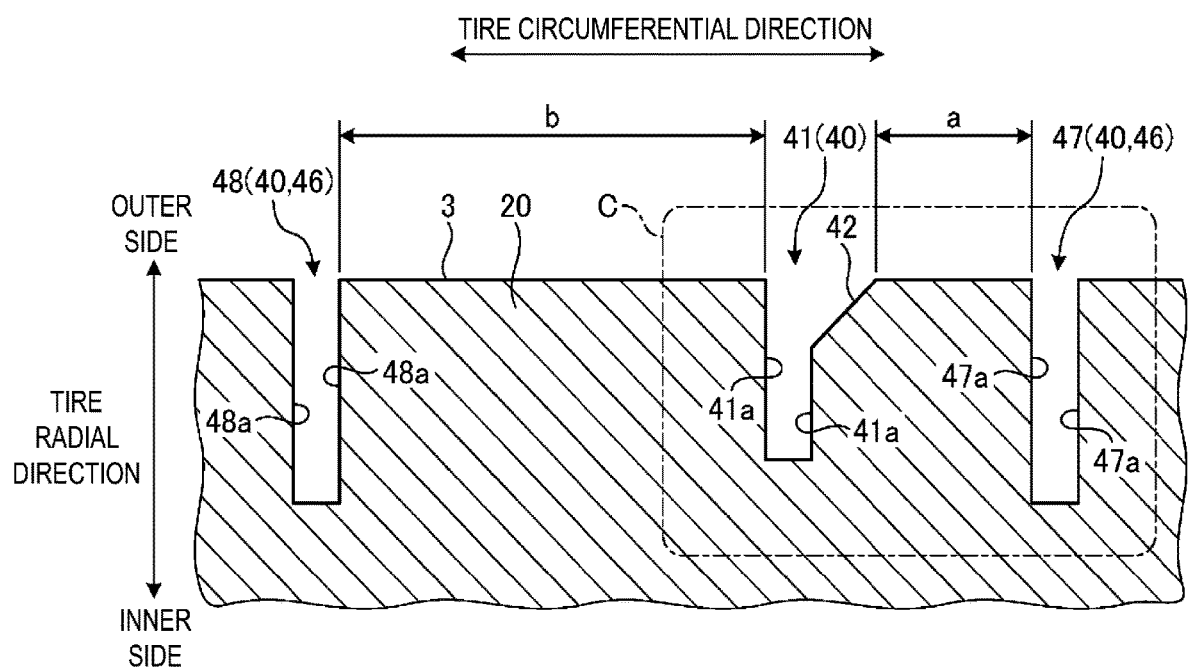
FIG. 4 is a cross-sectional view taken along B-B of FIG. 2.

FIG. 4 is a cross-sectional view taken along line B-B of FIG. 2. The distance a between the chamfered sipe 41 and the near sipe 47 is the distance a in the tire circumferential direction at a position of the chamfered sipe 41 where the distance from the chamfered sipe 41 including the chamfered portion 42 to the near sipe 47 is shortest. Similarly, the distance b between the chamfered sipe 41 and the remote sipe 48 is the distance b in the tire circumferential direction at a position of the chamfered sipe 41 where the distance from the chamfered sipe 41 including the chamfered portion 42 to the remote sipe 48 is shortest.

Here, in the present embodiment, of opposed wall surfaces 41a of the chamfered sipe 41, the wall surfaces 41a located on a side close to the near sipe 47 is provided with the chamfered portion 42. Consequently, in the present embodiment, the distance a between the chamfered sipe 41 and the near sipe 47 is the shortest distance in the tire circumferential direction between a portion of the chamfered portion 42 of the chamfered sipe 41, which is located nearest to the near sipe 47, and a wall surface 47a of the near sipe 47, which is located on the chamfered sipe 41 side. Also, the distance b between the chamfered sipe 41 and the remote sipe 48 is the shortest distance in the tire circumferential direction between the wall surface 41a of the chamfered sipe 41, which is located on the remote sipe 48 side, and a wall surface 48a of the remote sipe 48, which is located on the chamfered sipe 41 side.

The distance a between the chamfered sipe 41 and the near sipe 47 defined as just described and the distance b between the chamfered sipe 41 and the remote sipe 48 defined as just described preferably have the relationship $1.5 \leq (b/a) \leq 5$, and the relationship is more preferably in the range $3 \leq (b/a) \leq 5$. Also, the distance a between the chamfered sipe 41 and the near sipe 47 is preferably in the range of 3 mm or more and 6 mm or less.

Figure 5:
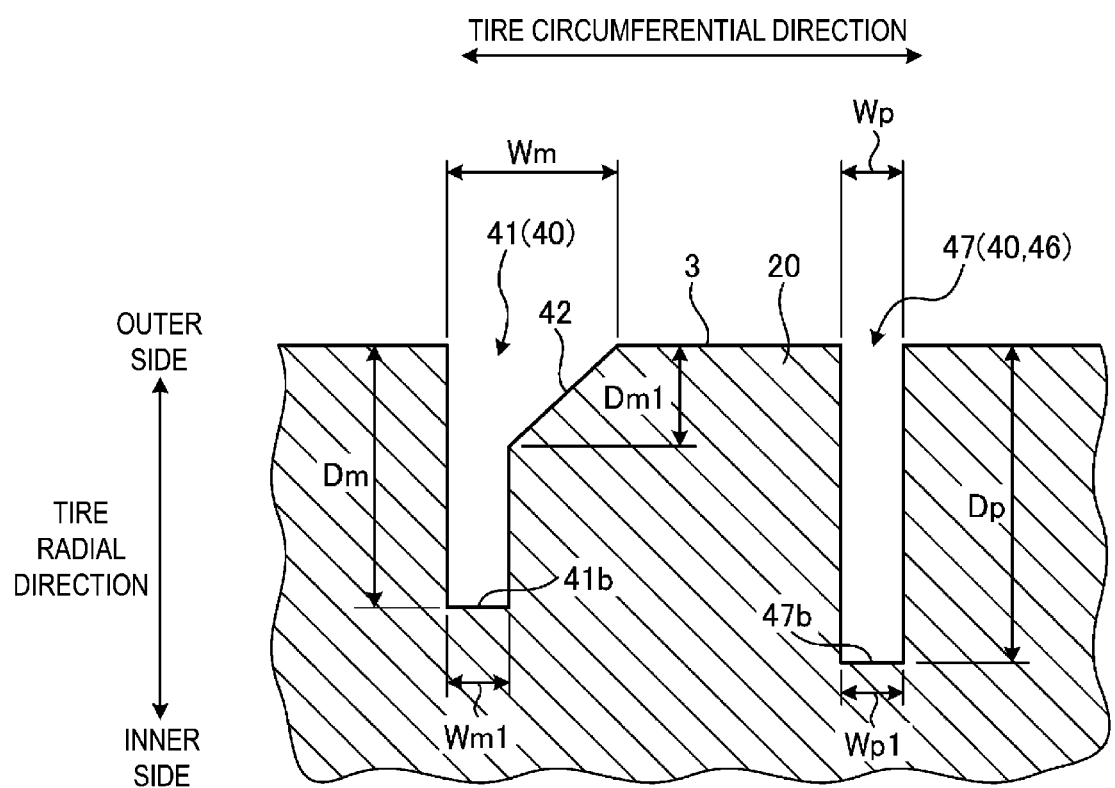
FIG. 5 is a detailed view of a portion C of FIG. 4.

FIG. 5 is a detailed view of the portion C of FIG. 4. The relationship between an opening width Wm of the chamfered sipe 41 and an opening width Wp of the near sipe 47 is in the range $1.2 \leq (Wm/Wp) \leq 6.0$. The opening width Wm of the chamfered sipe 41 in this case is a width of an opening portion of the chamfered sipe 41 including the chamfered portion 42 with respect to the road contact surface 3, and when the width of the opening portion changes, the width is a width at a position in which the maximum width is achieved. Similarly, the opening width Wp of the near sipe 47 is a width of an opening portion of the near sipe 47 with respect to the road contact surface 3, and when the width of the opening portion changes, the width is a width at a position in which the maximum width is achieved.

Note that the relationship between the opening width Wm of the chamfered sipe 41 and the opening width Wp of the near sipe 47 is preferably in the range $2.0 \leq (Wm/Wp) \leq 4.0$. Further, the opening width Wm of the chamfered sipe 41 is preferably in the range of 1.0 mm or more and 8.0 mm or less, and the opening width Wp of the near sipe 47 is preferably in the range of 0.8 mm or more and 1.8 mm or less.

Furthermore, the chamfered sipe 41 has the relationship between the opening width Wm and a groove bottom width Wm1 being within the range of $0.1 \leq (Wm1/Wm) \leq 0.85$. The groove bottom width Wm1 of the chamfered sipe 41 in this case is a width at a position in which the groove width at the position of a groove bottom 41b of the chamfered sipe 41 is largest. Note that the relationship between the opening width Wm and the groove bottom width Wm1 of the chamfered sipe 41 is preferably in the range $0.3 \leq (Wm1/Wm) \leq 0.6$, and the groove bottom width Wm1 of the chamfered sipe 41 is preferably in the range of 0.8 mm or more and 1.8 mm or less.

Additionally, the relationship between the groove bottom width Wm1 of the chamfered sipe 41 and a groove bottom width Wp1 of the near sipe 47 is in the range $0.3 \leq (Wm1/Wp1) \leq 3.0$. The groove bottom width Wp1 in this case is a width at a position in which the groove width at the position of a groove bottom 47b of the near sipe 47 is largest. Note that the relationship between the groove bottom width Wm1 of the chamfered sipe 41 and the groove bottom width Wp1 of the near sipe 47 is preferably in the range $0.5 \leq (Wm1/Wp1) \leq 2.0$.

Additionally, the relationship between a groove depth Dm of the chamfered sipe 41 and a groove depth Dp of the near sipe 47 is in the range $1.2 \leq (Dp/Dm) \leq 8.0$. The groove depth Dm of the chamfered sipe 41 and the groove depth Dp of the near sipe 47 in this case are a depth of each of the sipes 40 at a position at which the depth from the opening portion with respect to the road contact surface 3 to the groove bottom is largest.

Note that the relationship between the groove depth Dm of the chamfered sipe 41 and the groove depth Dp of the near sipe 47 is preferably in the range $1.4 \leq (Dp/Dm) \leq 2.0$. Further, the groove depth Dm of the chamfered sipe 41 is preferably in the range of 2.0 mm or more and 5.0 mm or less, and the groove depth Dp of the near sipe 47 is preferably in the range of 2.4 mm or more and 6.0 mm or less.

Furthermore, the chamfered sipe 41 has the relationship between the groove depth Dm and a chamfered portion depth Dm1 of the chamfered portion 42 being in the range $0.1 \leq (Dm1/Dm) \leq 0.85$. The chamfered portion depth Dm1 in this case is a depth of the chamfered portion 42 at a position at which the depth in the depth direction of the chamfered sipe 41 from the opening portion with respect to the road contact surface 3 to an end portion on the groove bottom 41b side of the chamfered sipe 41 is largest.

In addition, in the chamfered sipe 41, the relationship between the groove depth Dm and the chamfered portion depth Dm1 is preferably in the range $0.3 \leq (Dm1/Dm) \leq 0.6$, and the chamfered portion depth Dm1 is preferably in the range of 0.6 mm or more to 3.0 mm or less.

In the event of mounting the pneumatic tire 1 according to the present embodiment on a vehicle, the pneumatic tire 1 is mounted on a rim wheel and inflated with air inside to an inflated state, and then mounted to the vehicle. When the vehicle on which the pneumatic tires 1 are mounted travels, the pneumatic tires 1 each rotate while of the road contact surface 3 on the tread portion 2, the road contact surface 3 located at the bottom comes into contact with the road surface. When traveling on dry road surfaces, the vehicle on which the pneumatic tires 1 are mounted travels by, mainly with friction force between the road contact surface 3 and the road surfaces, transmitting driving force and braking force to the road surfaces and generating turning force. Additionally, during traveling on wet road surfaces, water between the road contact surface 3 and the road surfaces enters grooves such as the main grooves 30 and the sipes 40, and the vehicle travels while the water between the road contact surface 3 and the road surfaces is drained through the main grooves 30 and the sipes 40. As a result, the ground contact surface 3 is easily brought into contact with the road surfaces, and the vehicle can travel with friction force between the road contact surface 3 and the road surfaces.

In this case, a portion of the plurality of sipes 40 is formed as the chamfered sipes 41, and each of the chamfered sipes 41 includes the chamfered portion 42, and thus drainage properties can be ensured by the chamfered portion 42. In other words, even in a case where a portion located around the chamfered sipe 41 in the road contact surface 3 of the land portion 20 in which the chamfered sipes 41 are formed comes into contact with the road surface to be deformed in a direction in which the groove width decreases, the volume of the chamfered sipe 41 can be ensured by the chamfered portion 42. As a result, drainage properties of the chamfered sipe 41 can be improved. On the other hand, since the chamfered sipe 41 includes an end portion that terminates within the land portion 20, a decrease in rigidity of the land portion 20 in which the chamfered sipes 41 are formed can be suppressed, and thus steering stability when the vehicle is traveling can be ensured.

Additionally, in the sipes 40, the chamfered sipes 41 and the non-chamfered sipes 46 are alternately disposed in the tire circumferential direction, and the sipe 40 on one side in the tire circumferential direction of the chamfered sipe 41 is the near sipe 47 disposed at a distance relatively close to the chamfered sipe 41. Accordingly, when a portion on the road contact surface 3 of the land portion 20, which is located around the chamfered sipe 41, comes into contact with the ground, the land portion 20 around the chamfered sipe 41 can be deformed in a direction in which the groove width of the near sipe 47 decreases. This can prevent the chamfered sipe 41 from being significantly deformed in a direction in which the groove width of the chamfered sipe 41 decreases. In other words, when a portion on the road contact surface 3 of the land portion 20, which is located around the chamfered sipe 41, comes into contact with the ground, the near sipe 47 is crushed, and thus deformation of the land portion 20 can be absorbed by the near sipe 47, and crushing of the chamfered sipe 41 can be suppressed. Consequently, even when a portion located around the chamfered sipe 41 comes into contact with the ground, the volume of the chamfered sipe 41 including the chamfered portion 42 can be more reliably ensured, and drainage properties of the chamfered sipe 41 can be ensured.

Further, in the chamfered sipe 41 and the non-chamfered sipe 46, the relationship between the distance a between the chamfered sipe 41 and the near sipe 47 and the distance b between the chamfered sipe 41 and the remote sipe 48 is in the range $1.5 \leq (b/a) \leq 12$. Consequently, while rigidity of the land portion 20 is prevented from partially decreasing, crushing of the near sipe 47 can suppress crushing of the chamfered sipe 41.

In other words, when the relationship between the distance a and the distance b is $(b/a)<1.5$, the distance a between the chamfered sipe 41 and the near sipe 47 is too large. Consequently, when a portion of the land portion 20, which is located around the chamfered sipe 41, comes into contact with the ground, the near sipe 47 is not easily crushed, or even when the near sipe 47 is crushed, it is difficult to suppress crushing of the chamfered sipe 41. In other words, since the distance a between the chamfered sipe 41 and the near sipe 47 is too large, deformation of the near sipe 47 and deformation of the chamfered sipe 41 can be not easily affected with each other, and thus it is difficult to suppress crushing of the chamfered sipe 41 when a portion of the land portion 20, which is located around the chamfered sipe 41, comes into contact with the ground, In this case, when a portion of the land portion 20, which is located around the chamfered sipe 41, comes into contact with the ground, it may be difficult to ensure the volume of the chamfered sipe 41, and it may be difficult to ensure wet performance, which is running performance on wet road surfaces. Furthermore, when the relationship between the distance a and the distance b is $(b/a)>12$, the distance a between the chamfered sipe 41 and the near sipe 47 is too small. Consequently, rigidity of a portion of the land portion 20, which is located between the chamfered sipe 41 and the near sipe 47, may be too low. In this case, the rigidity of the land portion 20 is partially decreased, and thus it may be difficult to ensure steering stability mainly on dry road surfaces when the vehicle is traveling.

In contrast, when the relationship between the distance a and the distance b is in the range $1.5 \leq (b/a) \leq 12$, the rigidity of a portion of the land portion 20, which is located between the chamfered sipe 41 and the near sipe 47, is prevented from being too low, deformation of the near sipe 47 and deformation of the chamfered sipe 41 can be affected with each other. As a result, while the rigidity of the land portion 20 is prevented from being partially decreased, crushing of the chamfered sipe 41 can be suppressed by crushing of the near sipe 47 when a portion of the land portion 20, which is located around the chamfered sipe 41, comes into contact with the ground. As a result, wet performance can be ensured while a decrease in steering stability is suppressed.

Additionally, the relationship between the length Lm of the chamfered sipe 41 and the length Lp of the near sipe 47 is in the range $0.2 \leq (Lm/Lp) \leq 0.95$. Consequently, while the rigidity of a portion of the land portion 20, which is located near the near sipe 47, is prevented from being too low, crushing of the chamfered sipe 41 can be suppressed by crushing of the near sipe 47 with an appropriate length.

In other words, when the relationship between the length Lm of the chamfered sipe 41 and the length Lp of the near sipe 47 is $(Lm/Lp)<0.2$, the length Lp of the near sipe 47 is too long. Consequently, the rigidity of a portion of the land portion 20, which is located near the near sipe 47, may be too low. In this case, the rigidity of the land portion 20 is partially decreased, and thus it may be difficult to ensure steering stability when the vehicle is traveling. Further, when the relationship between the length Lm of the chamfered sipe 41 and the length Lp of the near sipe 47 is (Lm/Lp)>0.95, the length Lp of the near sipe 47 may be too short. In this case, even in a case in which the near sipe 47 is crushed when a portion of the land portion 20, which is located around the chamfered sipe 41, comes into contact with the ground, the near sipes 47 is crushed with a short length. Consequently, it may be difficult to suppress crushing of the chamfered sipe 41 by crushing of the near sipes 47, and it may be difficult to ensure drainage properties of the chamfered sipe 41.

In contrast, when the relationship between the length Lm of the chamfered sipe 41 and the length Lp of the near sipe 47 is in the range 0.2≤(Lm/Lp)≤0.95, while the rigidity of a portion of the land portion, which is located near the near sipe 47, is prevented from being too low, the near sipe 47 is crushed with an appropriate length when a portion of the land portion 20, which is located around the chamfered sipe 41, comes into contact with the ground, and thus, the chamfered sipe 41 can be prevented from being crushed. As a result, wet performance can be ensured while a decrease in steering stability is more reliably suppressed.

Additionally, of the opposed wall surfaces 41a of the chamfered sipe 41, the wall surface 41a located on a side close to the near sipe 47 is provided with the chamfered portion 42. Accordingly, a portion of the land portion 20, which is located around the chamfered sipe 41, comes into contact with the ground, the near sipe 47 is crushed, and thus a portion of the chamfered sipe 41, which is located at or near the chamfered portion 42, can be more reliably prevented from being crushed. Consequently, the volume of the chamfered sipe 41 can be more reliably ensured by the chamfered portion 42, and drainage properties of the chamfered sipe 41 can be improved. As a result, wet performance can be more reliably improved.

Further, the relationship between the opening width Wm of the chamfered sipe 41 and the opening width Wp of the near sipe 47 is in the range 1.2≤(Wm/Wp)≤6.0, and thus, while the volume of the chamfered sipe 41 is ensured, the rigidity of a portion of the land portion 20, which is located around the chamfered sipe 41, can be prevented from being too low. In other words, when the relationship between the opening width Wm of the chamfered sipe 41 and the opening width Wp of the near sipe 47 is (Wm/Wp)<1.2, the opening width Wm of the chamfered sipe 41 is too small, and thus it may be difficult to ensure the volume of the chamfered sipe 41. In this case, it is difficult to ensure drainage properties of the chamfered sipe 41, and wet performance may be difficult to be ensured by the chamfered sipe 41. Furthermore, when the relationship between the opening width Wm of the chamfered sipe 41 and the opening width Wp of the near sipe 47 is (Wm/Wp)>6.0, the opening width Wm of the chamfered sipe 41 is too large, and thus the rigidity of a portion of the land portion 20, which is located around the chamfered sipe 41, may be too low. In this case, the rigidity of the land portion 20 is partially decreased, and thus it may be difficult to ensure steering stability when the vehicle is traveling.

In contrast, when the relationship between the opening width Wm of the chamfered sipe 41 and the opening width Wp of the near sipe 47 is in the range 1.2≤(Wm/Wp)≤6.0, while the volume of the chamfered sipe 41 is ensured, the rigidity of a portion of the land portion 20, which is located around the chamfered sipe 41, is prevented from being too low. As a result, wet performance can be ensured while a decrease in steering stability is more reliably suppressed.

Further, in the chamfered sipe 41, the relationship between the opening width Wm and the groove bottom width Wm1 is in the range 0.1≤(Wm1/Wm)≤0.85, and thus, while the volume of the chamfered sipe 41 is ensured, the rigidity of a portion of the land portion 20, which is located around the chamfered sipe 41, is prevented from being too low. In other words, when the relationship between the opening width Wm and the groove bottom width Wm1 of the chamfered sipe 41 is (Wm1/Wm)<0.1, the groove bottom width Wm1 of the chamfered sipe 41 is too small, and thus it may be difficult to ensure the volume of the chamfered sipe 41. In this case, it is difficult to ensure drainage properties of the chamfered sipe 41, and wet performance may be difficult to be ensured by the chamfered sipe 41. Furthermore, when the relationship between the opening width Wm and the groove bottom width Wm1 of the chamfered sipe 41 is (Wm1/Wm)>0.85, the groove bottom width Wm1 of the chamfered sipe 41 is too large, and thus the rigidity of a portion of the land portion 20, which is located around the chamfered sipe 41, may be too low. In this case, the rigidity of the land portion 20 is partially decreased, and thus it may be difficult to ensure steering stability when the vehicle is traveling.

In contrast, when the relationship between the opening width Wm and the groove bottom width Wm1 of the chamfered sipe 41 is within the range 0.1≤(Wm1/Wm)≤0.85, while the volume of the chamfered sipe 41 is ensured, the rigidity of a portion of the land portion 20, which is located around the chamfered sipe 41, can be prevented from being too low. As a result, wet performance can be ensured while a decrease in steering stability is more reliably suppressed.

Further, the near sipe 47 communicates with the two main grooves 30 that define the land portion 20, that is, extends in the tire width direction through the land portion 20 in which the near sipes 47 are formed, and thus, the rigidity of the periphery of a portion of the land portion 20 where the near sipe 47 is formed can be more reliably reduced. As a result, when a portion of the land portion 20, which is located around the chamfered sipe 41, comes into contact with the ground, the near sipe 47 can be more reliably crushed. The near sipe 47 is crushed, and thus deformation of the land portion 20 can be absorbed by the near sipe 47. Accordingly, crushing of the chamfered sipe 41 can be more reliably suppressed, and thus the volume of the chamfered sipe 41 can be ensured, and drainage properties of the chamfered sipe 41 can be improved. As a result, wet performance can be more reliably improved.

Further, the relationship between the groove depth Dm of the chamfered sipe 41 and the groove depth Dp of the near sipe 47 is within the range 1.2≤(Dp/Dm)≤8.0, and thus the rigidity of a portion of the land portion 20, which is located near the near sipe 47, is prevented from being too low, and crushing of the chamfered sipe 41 can be suppressed by crushing of the near sipe 47. In other words, when the relationship between the groove depth Dm of the chamfered sipe 41 and the groove depth Dp of the near sipe 47 is (Dp/Dm)<1.2, the groove depth Dp of the near sipe 47 is too small, and thus it may be difficult to absorb deformation of the land portion 20 by crushing of the near sipe 47. In this case, when a portion of the land portion 20, which is located around the chamfered sipe 41, comes into contact with the ground, crushing of the chamfered sipe 41 is not easily suppressed, and it may be difficult to ensure drainage properties of the chamfered sipe 41. Furthermore, when the relationship between the groove depth Dm of the chamfered sipe 41 and the groove depth Dp of the near sipe 47 is (Dp/Dm)>8.0, the groove depth Dp of the near sipe 47 is too large, and thus the rigidity of a portion of the land portion 20, which is located around the near sipe 47, may be too low. In this case, the rigidity of the land portion 20 is partially decreased, and thus it may be difficult to ensure steering stability when the vehicle is traveling.

In contrast, when the relationship between the groove depth Dm of the chamfered sipe 41 and the groove depth Dp of the near sipe 47 is within the range 1.2≤(Dp/Dm)≤8.0, while the rigidity of a portion of the land portion 20, which is located near the near sipe 47, is prevented from being too low, crushing of the chamfered sipe 41 when a portion of the land portion 20, which is located around the chamfered sipe 41, comes into contact with the ground can be suppressed by crushing of the near sipe 47. As a result, wet performance can be ensured while a decrease in steering stability is more reliably suppressed.

Further, in the chamfered sipe 41, the relationship between the groove depth Dm and the chamfered portion depth Dm1 is in the range 0.1≤(Dm1/Dm)≤0.85, and thus, while a decrease in rigidity of the land portion 20 is suppressed, drainage properties of the chamfered sipe 41 can be improved by the chamfered portion 42. In other words, when the relationship between the groove depth Dm and the chamfered portion depth Dm1 of the chamfered sipe 41 is (Dm1/Dm)<0.1, the chamfered portion depth Dm1 of the chamfered sipe 41 is too small, and thus even when the chamfered portion 42 is provided on the chamfered sipe 41, drainage properties of the chamfered sipe 41 may be difficult to be improved by the chamfered portion 42. Furthermore, when the relationship between the groove depth Dm and the chamfered portion depth Dm1 of the chamfered sipe 41 is (Dm1/Dm)>0.85, the chamfered portion depth Dm1 of the chamfered sipe 41 is too large, and thus the volume of a portion of the land portion 20, which is located around the chamfered sipe 41, is small, and the rigidity of the land portion 20 in which the chamfered sipes 41 are formed is likely to decrease.

In contrast, when the relationship between the groove depth Dm and the chamfer depth Dm1 of the chamfered sipe 41 is in the range 0.1≤(Dm1/Dm)≤0.85, while the rigidity of the land portion 20 in which the chamfered sipes 41 are formed is prevented from being low, drainage properties of the chamfered sipe 41 can be effectively improved by the chamfered portion 42. As a result, wet performance can be ensured while a decrease in steering stability is more reliably suppressed.

Further, since the plurality of chamfered sipes 41 formed in the identical land portion 20 communicate with the identical main groove 30, a difference in rigidity can be generated between an edge of the land portion 20, which is located on the side defined by the main groove 30 with which the chamfered sipe 41 communicates, and an edge of the land portion 20, which is located on the side defined by the main groove 30 on the opposite side. Accordingly, the rigidity of the land portion 20 is low at the edge side on the side defined by the main groove 30 with which the chamfered sipe 41 communicates, and thus the near sipe 47 can be easily crushed, and crushing of the chamfered sipe 41 can be suppressed by crushing of the near sipe 47. Furthermore, the number of sipes 40 that communicate with the main groove 30 is small in the land portion 20 at the edge side on the side defined by the main groove 30 that is located on the opposite side of the main groove 30 with which the chamfered sipe 41 communicates, and the rigidity of the land portion 20 is ensured. Consequently, when the vehicle is traveling, a feeling of rigidity at an initial steering stage can be improved. As a result, wet performance can be ensured while a decrease in steering stability is more reliably suppressed.

Modified Example

Figure 6:
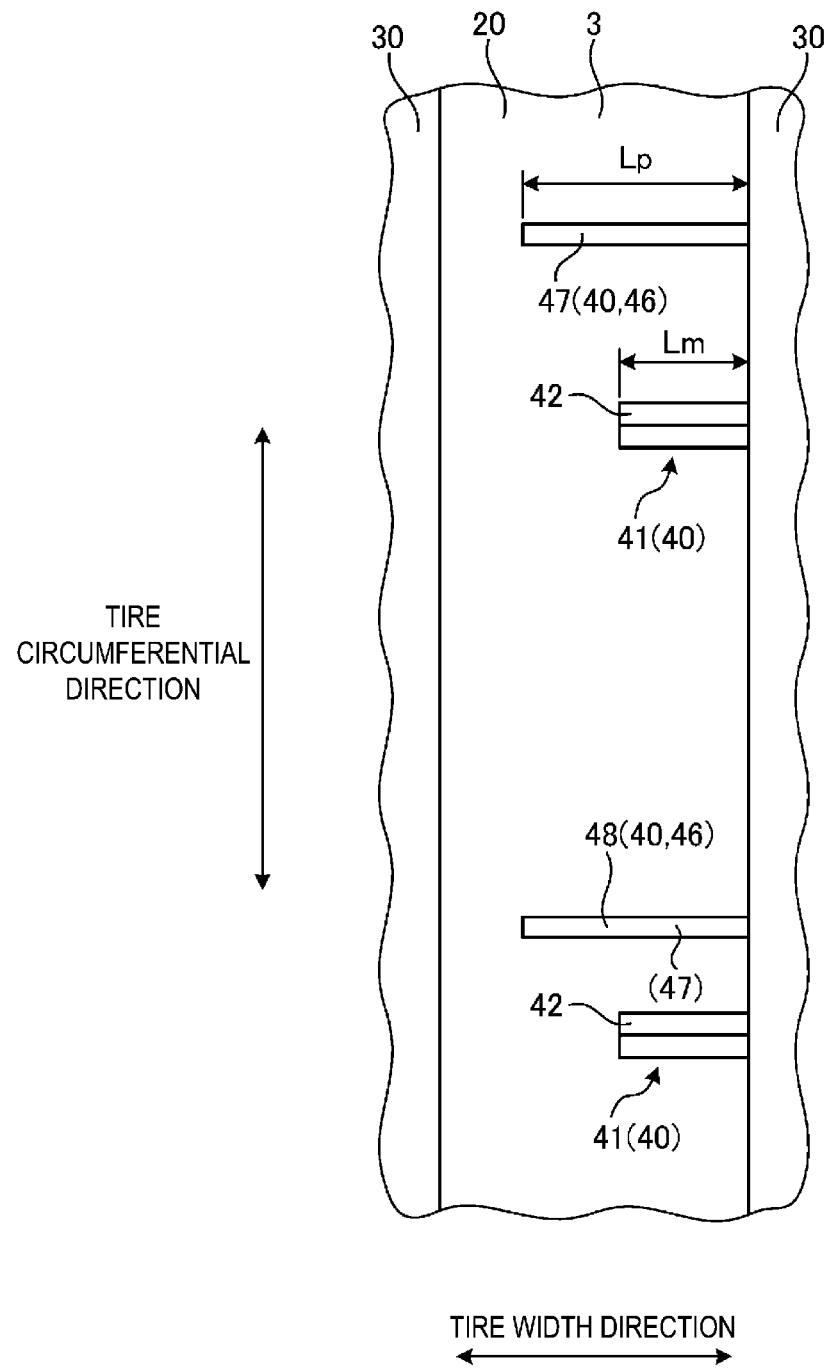
FIG. 6 is an explanatory diagram of a modified example of a pneumatic tire according to an embodiment, illustrating a case where non-chamfered sipes communicate only with a main groove on one side.

Additionally, in the embodiment described above, the non-chamfered sipe 46 communicates with both of the two main grooves 30 that define the land portion 20, however, the non-chamfered sipe 46 does not have to communicate with both of the two main grooves 30. FIG. 6 is an explanatory diagram of a modified example of the pneumatic tire 1 according to an embodiment, illustrating a case where the non-chamfered sipe 46 only communicates with one of the main grooves 30. As illustrated in FIG. 6, for example, the non-chamfered sipe 46 only communicates with one of the main grooves 30 of the two main grooves 30 that define the both sides of the land portion 20 in the tire width direction, and the end portion on the opposite side of the end portion on the side communicating with the main groove 30 may terminate within the land portion 20. In other words, the near sipe 47 and the remote sipe 48 may have one end communicating with the main groove 30 and the other end terminating within the land portion 20. In this case, as illustrated in FIG. 6, of the two main grooves 30 that define the land portion 20, the plurality of non-chamfered sipes 46 preferably communicate with the identical main groove 30 as the main groove 30 with which the chamfered sipe 41 communicates. As described above, even when the non-chamfered sipe 46 only communicates with one of the main grooves 30, the relationship between the length Lm of the chamfered sipe 41 and the length Lp of the near sipe 47 is preferably in the range 0.2≤(Lm/Lp)≤0.95.

Figure 7:
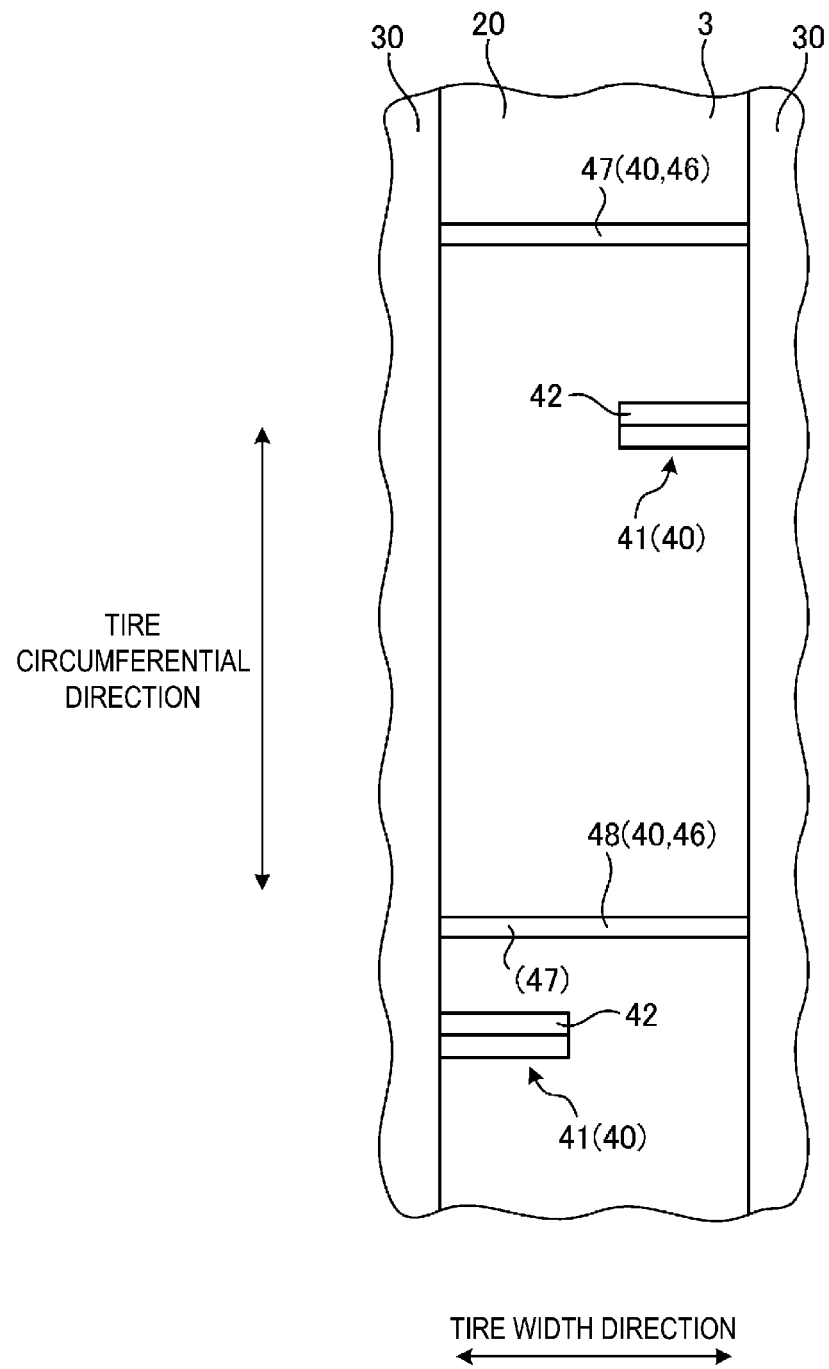
FIG. 7 is an explanatory diagram of a modified example of a pneumatic tire according to an embodiment, illustrating a case where chamfered portions communicate with different main grooves.

Additionally, in the embodiment described above, the plurality of chamfered sipes 41 formed in the identical land portion 20 communicate with the identical main groove 30, however, the plurality of chamfered sipes 41 may not communicate with the identical main groove 30. FIG. 7 is an explanatory diagram of a modified example of the pneumatic tire 1 according to an embodiment, illustrating a case where the chamfered sipes 41 communicate with the different main grooves 30. As illustrated in FIG. 7, the chamfered sipes 41 formed in the identical land portion 20 may communicate with the different main grooves 30. In this case, the chamfered sipes 41 adjacent to each other in the tire circumferential direction with the non-chamfered sipe 46 in between may alternately communicate with the different main grooves 30. Alternatively, of the plurality of chamfered sipes 41 formed in the identical land portion 20, the chamfered sipes 41 adjacent to each other in the tire circumferential direction with the non-chamfered sipe 46 in between communicating with the different main grooves 30 and the chamfered sipes 41 adjacent to each other in the tire circumferential direction with the non-chamfered sipe 46 in between communicating with the identical main groove 30 may coexist.

Figure 8:
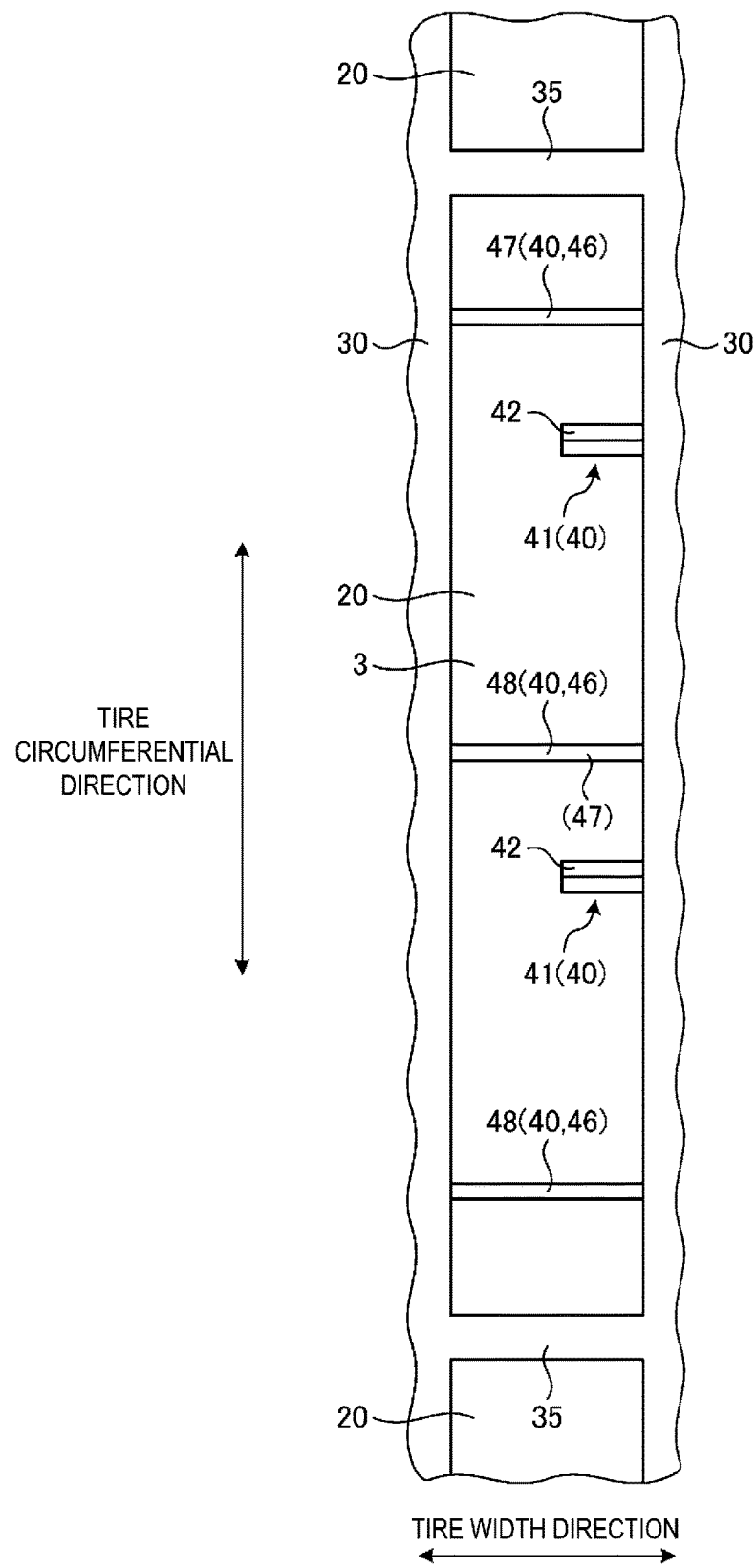
FIG. 8 is an explanatory diagram of a modified example of a pneumatic tire according to an embodiment, illustrating a case where a land portion is formed in block shapes.

Moreover, in the embodiment described above, the land portion 20, in which the sipes 40 are formed, is formed in a rib shape, but the land portion 20 may be formed in a shape other than a rib shape. FIG. 8 is an explanatory diagram of a modified example of the pneumatic tire 1 according to an embodiment, illustrating a case where the land portion 20 is formed in a block shape. As illustrated in FIG. 8, for example, the land portion 20 may be formed in a so-called block shape such that the both sides in the tire width direction are defined by the main grooves 30 and that the both sides in the tire circumferential direction are defined by lug grooves 35. In other words, in addition to the main grooves 30 extending in the tire circumferential direction, a plurality of lug grooves 35 extending in the tire width direction may be formed in the road contact surface 3 of the tread portion 2, and the land portion 20 in which the sipes 40 are formed may be defined by the main grooves 30 and the lug grooves 35. In this case, the sipes 40 are preferably disposed such that the plurality of chamfered sipes 41 and the plurality of non-chamfered sipes 46 are alternately disposed in the tire circumferential direction in the single land portion 20 having a block shape. As long as the sipes 40 are disposed such that the chamfered sipes 41 and the non-chamfered sipes 46 are alternately disposed in the tire circumferential direction, the land portion 20 in which the sipes 40 are formed may have any shape.

Additionally, in the embodiment described above, the rotation direction of the pneumatic tire 1 is not particularly specified, but the pneumatic tire 1 may be the pneumatic tire 1 having a rotation direction designated when mounted on a vehicle. In other words, the pneumatic tire 1 in which the sipes 40 are formed may be the pneumatic tire 1 to be mounted on a vehicle such that the tire rotates in the designated rotation direction about the rotation axis when the vehicle moves forward. In this case, the pneumatic tire 1 includes a rotation direction indicator portion (not illustrated) that indicates the rotation direction. The rotation direction indicator portion is formed of, for example, a mark or recesses/protrusions provided on the sidewall portion 8 of the tire.

Figure 9:
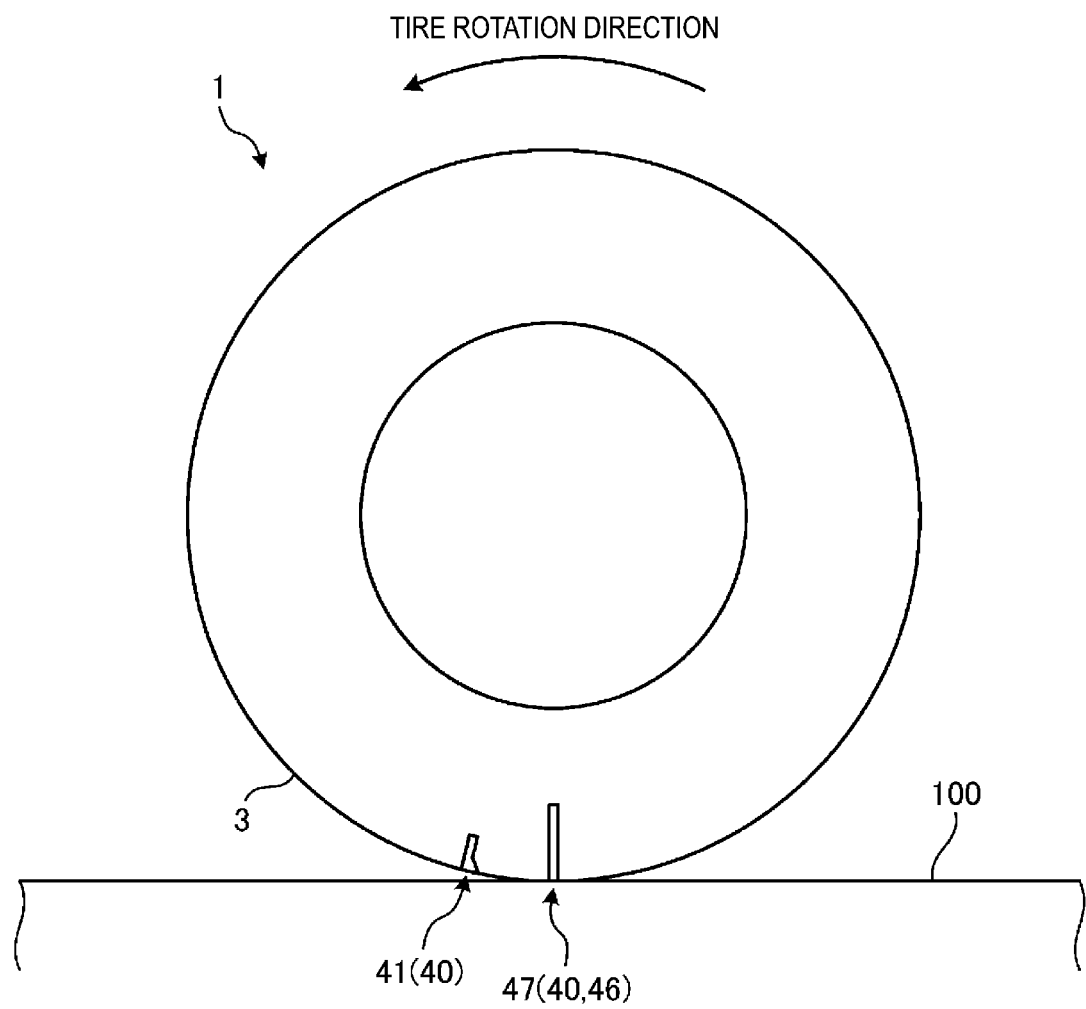
FIG. 9 is a schematic diagram of a modified example of a pneumatic tire according to an embodiment, illustrating the arrangement of sipes with respect to the rotation direction of the pneumatic tire.

FIG. 9 is a schematic diagram of a modified example of the pneumatic tire 1 according to an embodiment, illustrating the arrangement of the sipes 40 with respect to the rotation direction of the pneumatic tire 1. The pneumatic tire 1 in which the chamfered sipes 41 and the non-chamfered sipes 46 are alternately disposed in the tire circumferential direction on the road contact surface 3 may be the pneumatic tire 1 having a rotation direction designated when mounted on a vehicle. In this case, as illustrated in FIG. 9, the near sipe 47 is preferably disposed on the leading side in the tire rotation direction and the chamfered sipe 41 is preferably disposed on the trailing side in the tire rotation direction.

The leading side in the tire rotation direction in this case is the rotation direction side when the pneumatic tire 1 is rotated in the designated direction. In a case where the pneumatic tire 1 is mounted on a vehicle and rotated in the designated direction and travels, the leading side is the side that first comes into contact with a road surface 100 or first separates from the road surface 100. In addition, the trailing side in the tire rotation direction is the opposite side to the rotation direction when the pneumatic tire 1 is rotated in the designated direction. In a case where the pneumatic tire 1 is mounted on a vehicle and rotated in the designated direction and travels, the trailing side is the side that comes in contact with the road surface 100 after a portion located on the leading side or that separates from the road surface 100 after a portion located on the leading side.

For the chamfered sipe 41 and the near sipe 47 disposed side by side in the tire circumferential direction, the near sipe 47 is disposed on the leading side in the tire rotation direction, and the near sipe 47 comes into contact with the road surface 100 prior to the chamfered sipe 41. Accordingly, the near sipe 47 can further absorb deformation of the land portion 20. As a result, crushing of the chamfered sipe 41 can be more reliably suppressed, and wet performance can be more reliably improved.

Figure 10:
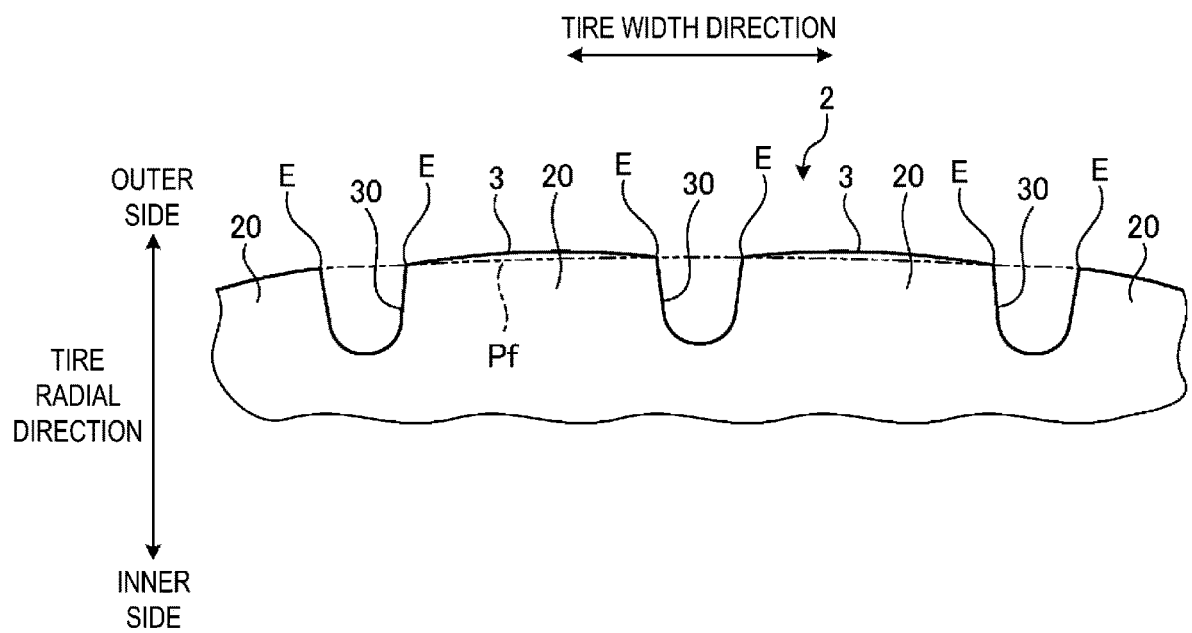
FIG. 10 is a schematic diagram of a modified example of a pneumatic tire according to an embodiment, illustrating a main portion of a land portion bulging.

Additionally, the land portion 20, in which the sipes 40 are formed, may be formed in a shape such that the road contact surface 3 bulges toward an outer side in the tire radial direction. FIG. 10 is a schematic diagram of a modified example of the pneumatic tire 1 according to an embodiment, illustrating a main portion of the land portion 20 bulging. As illustrated in FIG. 10, the land portion 20 in which the chamfered sipes 41 are formed may include the road contact surface 3 that bulges from a standard contour line Pf of a tread profile toward the outer side in the tire radial direction in a tire meridian cross-sectional view. The standard contour line Pf of the tread profile in this case is a contour line that serves as a reference for the shape of the road contact surface 3 of the land portion 20 in a state where internal pressure is not inflated. The standard contour line Pf of the tread profile is a circular arc that, specifically, in the tire meridian cross-sectional view in a state where internal pressure is not inflated, passes through at least three of four opening ends E of the two main grooves 30 adjacent at the both sides in the tire width direction of the land portion 20, and that is drawn with a maximum radius of curvature with the center of the arc located on an inner side in the tire radial direction of the road contact surface 3.

The land portion 20, in which the chamfered sipes 41 are formed, has the radius of curvature of the road contact surface 3 in the tire meridian cross-sectional view being smaller than the radius of curvature of the standard contour line Pf of the tread profile defined as just described. Accordingly, the shape of the road contact surface 3 in the tire meridian cross-sectional view is formed to bulge from the standard contour line Pf of the tread profile toward the outer side in the tire radial direction. Consequently, the thickness of the land portion 20 is larger at the center position in the tire width direction than the positions of both end portions in the tire width direction.

By forming the road contact surface 3 of the land portion 20 to bulge toward the outer side in the tire radial direction further than the standard contour line Pf of the tread profile as just described, when traveling on wet road surfaces, water located between the road contact surface 3 and the road surface can be fed toward the main groove 30 that defines the end portion of the land portion 20 in the tire width direction. As a result, drainage properties can be more reliably improved, and wet performance can be more reliably improved.

Additionally, in the embodiment described above, the chamfered sipe 41 and the non-chamfered sipe 46 are illustrated in a shape extending in a straight line in the tire width direction, however, each of the sipes 40 may have a shape other than such a shape. The sipe 40 may be inclined in the tire circumferential direction while extending in the tire width direction or may be repeatedly bent or curved in the tire circumferential direction while extending in the tire width direction.

Further, the three main grooves 30 are formed in the embodiment described above, but the number of main grooves 30 may be other than three. The main grooves 30 formed in the tread portion 2 are preferably in a range of three or more and five or less. Furthermore, the main groove 30 may be formed in a shape other than a straight line when extending in the tire circumferential direction. For example, the main groove 30 may be repeatedly bent or curved in the tire width direction while extending in the tire circumferential direction.

Examples

FIG. 11A to 11D are tables indicating the results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. Performance evaluation tests were performed on wet braking performance that is braking performance on wet road surfaces and on steering stability.

The performance evaluation tests were performed by mounting pneumatic tires 1 each having a tire nominal size of 195/65R15 91H specified by JATMA (The Japan Automobile Tyre Manufacturers Association, Inc.) on JATMA standard rim wheels each having a rim size of 15×6.5J, adjusting air pressure to 250 kPa, mounting the test tires on an evaluation vehicle, and then driving on the evaluation vehicle.

In the evaluation method for each of the test items, for wet braking performance, the evaluation vehicle on which the test tires are mounted was driven at an initial velocity of 100 km/h on water-sprinkled road surfaces of a test course, and a braking distance on braking was measured. The reciprocal of the measured distance is expressed as an index value with the Conventional Example, described below, being assigned as the value of 100. Larger index values indicate shorter braking distance and superior wet braking performance.

Additionally, the steering stability was compared in the sensory evaluation by a test driver when the evaluation vehicle on which the test tires were mounted was driven on dry road surfaces of a test course. Steering stability was evaluated by expressing the sensory evaluation by a test driver as an index value with the Conventional Example, described below, being assigned the value of 100. Larger index values indicate superior steering stability. Note that when the index value is 98 or more, a decrease in steering stability is suppressed.

The performance evaluation tests were performed on thirty two types of pneumatic tires that are a pneumatic tire of Conventional Example as an example of a conventional pneumatic tire, pneumatic tires of Examples 1 to 29 corresponding to the pneumatic tire 1 according to an embodiment of the present technology, and pneumatic tires of Comparative Examples 1, 2 compared with the pneumatic tire 1 according to an embodiment of the present technology. Of the tires, Conventional Example does not include the near sipe 47 located near the chamfered sipe 41. Further, while Comparative Example 1 includes the near sipe 47 located near the chamfered sipe 41, the ratio of the distance b between the chamfered sipe 41 and the remote sipe 48 to the distance a between the chamfered sipe 41 and the near sipe 47 is less than 1.5. Furthermore, while Comparative Example 2 includes the near sipe 47 in the identical manner as Comparative Example 1, the ratio of the distance b between the chamfered sipe 41 and the remote sipe 48 to the distance a between the chamfered sipe 41 and the near sipe 47 is larger than 12.

In contrast, in all of Examples 1 to 29, each of which is an example of the pneumatic tire 1 according to an embodiment of the present technology, the ratio of the distance b between the chamfered sipe 41 and the remote sipe 48 to the distance a between the chamfered sipe 41 and the near sipe 47 is in the range $1.5 \leq (b/a) \leq 12$. Additionally, in the pneumatic tires 1 according to Examples 1 to 29, the ratio (Lm/Lp) of the length Lm of the chamfered sipe 41 to the length Lp of the near sipe 47, the direction in which the chamfered portion 42 of the chamfered sipe 41 is disposed, the ratio (Wm/Wp) of the opening width Wm of the chamfered sipe 41 to the opening width Wp of the near sipe 47, the ratio (Wm1/Wm) of the groove bottom width Wm1 to the opening width Wm of the chamfered sipe 41, the presence of communication of the near sipe 47 with the two main grooves 30 that define the land portion 20, the ratio (Dp/Dm) of the groove depth Dp of the near sipe 47 to the groove depth Dm of the chamfered sipe 41, the ratio (Dm1/Dm) of the chamfered portion groove depth Dm1 to the groove depth Dm of the chamfered sipe 41, the main groove 30 with which the plurality of chamfered sipes 41 formed in the identical land portion 20, the sipe 40 located on the leading side in the tire rotation direction, and the presence of the land portion 20 including the road contact surface 3 that bulges toward the outer side in the tire radial direction differ from one another.

As a result of performing the performance evaluation tests using these pneumatic tires 1, as indicated in FIGS. 11A to 11D, it was revealed that compared with Conventional Example and Comparative Examples 1, 2, the pneumatic tires 1 according to Examples 1 to 29 can improve wet braking performance while suppressing a decrease in steering stability as much as possible. In other words, the pneumatic tires 1 according to Examples 1 to 29 can ensure wet performance while suppressing a decrease in steering stability.

The invention claimed is:

1. A pneumatic tire, comprising:
   a plurality of main grooves extending in a tire circumferential direction;
   a land portion comprising end portions in a tire width direction that are defined by the main grooves;
   a plurality of chamfered sipes formed in the land portion, each of the chamfered sipes comprising a chamfered portion; and
   a plurality of non-chamfered sipes formed in the land portion, each of the non-chamfered sipes not comprising a chamfered portion, wherein
   the chamfered sipe comprises one end communicating with one of the main grooves that defines the land portion and an other end terminating within the land portion,
   the chamfered sipes and the non-chamfered sipes are alternately disposed in the tire circumferential direction, only a single one of the chamfered sipes being provided in the land portion between circumferentially adjacent non-chamfered sipes,
   of the non-chamfered sipes located on both sides in the tire circumferential direction of the chamfered sipe, a relationship between a distance a and a distance b in the tire circumferential direction is in a range $1.5 \leq (b/a) \leq 12$, where the distance a in the tire circumferential direction is a distance between the chamfered sipe and a near sipe corresponding to the non-chamfered sipe that is located on a side close to the chamfered sipe in the tire circumferential direction, and the distance b in the tire circumferential direction is a distance between the chamfered sipe and the non-chamfered sipe that is located on a side remote from the chamfered sipe in the tire circumferential direction, and
   of opposed wall surfaces of the chamfered sipe, only the wall surface located on a side close to the near sipe is provided with the chamfered portion.

2. The pneumatic tire according to claim 1, wherein a relationship between a length Lm of the chamfered sipe and a length Lp of the near sipe is in a range $0.2 \leq (Lm/Lp) \leq 0.95$.

3. The pneumatic tire according to claim 2, wherein a relationship between an opening width Wm of the chamfered sipe and an opening width Wp of the near sipe is in a range $1.2 \leq (Wm/Wp) \leq 6.0$.

4. The pneumatic tire according to claim 3, wherein the chamfered sipe has a relationship between an opening width Wm and a groove bottom width Wm1 being in a range $0.1 \leq (Wm1/Wm) \leq 0.85$.

5. The pneumatic tire according to claim 4, wherein
both sides of the land portion in the tire width direction are defined by the main grooves, and
the near sipe communicates with two of the main grooves that define the land portion.

6. The pneumatic tire according to claim 5, wherein a relationship between a groove depth Dm of the chamfered sipe and a groove depth Dp of the near sipe is in a range $1.2 \leq (Dp/Dm) \leq 8.0$.

7. The pneumatic tire according to claim 6, wherein the chamfered sipe has a relationship between a groove depth Dm and a chamfered portion depth Dm1 being in a range $0.1 \leq (Dm1/Dm) \leq 0.85$.

8. The pneumatic tire according to claim 7, wherein
both sides of the land portion in the tire width direction are defined by the main grooves, and
the plurality of chamfered sipes formed in an identical land portion communicate with an identical main groove.

9. The pneumatic tire according to claim 8, wherein of the chamfered sipe and the near sipe, the near sipe is disposed on a leading side in a tire rotation direction.

10. The pneumatic tire according to claim 9, wherein the land portion in which the chamfered sipes are formed comprises a road contact surface that bulges from a standard contour line of a tread profile toward an outer side in a tire radial direction in a tire meridian cross-sectional view.

11. The pneumatic tire according to claim 1, wherein a relationship between an opening width Wm of the chamfered sipe and an opening width Wp of the near sipe is in a range $1.2 \leq (Wm/Wp) \leq 6.0$.

12. The pneumatic tire according to claim 1, wherein the chamfered sipe has a relationship between an opening width Wm and a groove bottom width Wm1 being in a range $0.1 \leq (Wm1/Wm) \leq 0.85$.

13. The pneumatic tire according to claim 1, wherein
both sides of the land portion in the tire width direction are defined by the main grooves, and
the near sipe communicates with two of the main grooves that define the land portion.

14. The pneumatic tire according to claim 1, wherein a relationship between a groove depth Dm of the chamfered sipe and a groove depth Dp of the near sipe is in a range $1.2 \leq (Dp/Dm) \leq 8.0$.

15. The pneumatic tire according to claim 1, wherein the chamfered sipe has a relationship between a groove depth Dm and a chamfered portion depth Dm1 being in a range $0.1 \leq (Dm1/Dm) \leq 0.85$.

16. The pneumatic tire according to claim 1, wherein
both sides of the land portion in the tire width direction are defined by the main grooves, and
the plurality of chamfered sipes formed in an identical land portion communicate with an identical main groove.

17. The pneumatic tire according to claim 1, wherein of the chamfered sipe and the near sipe, the near sipe is disposed on a leading side in a tire rotation direction.

18. The pneumatic tire according to claim 1, wherein the land portion in which the chamfered sipes are formed comprises a road contact surface that bulges from a standard contour line of a tread profile toward an outer side in a tire radial direction in a tire meridian cross-sectional view.

* * * * *